May 30, 1961  J. G. HART  2,985,904
WINDSHIELD WIPER BLADE ASSEMBLIES
Filed Oct. 29, 1958  2 Sheets-Sheet 1
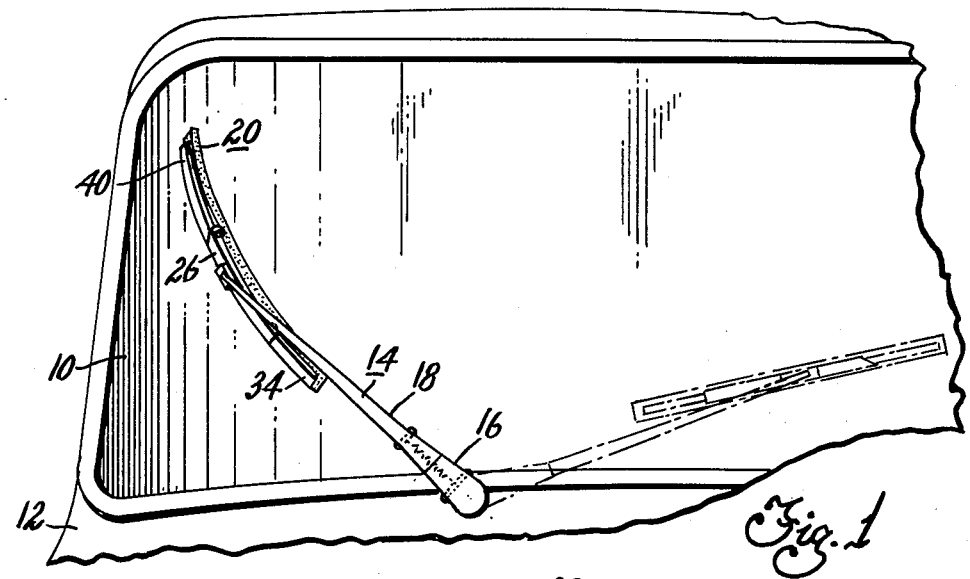
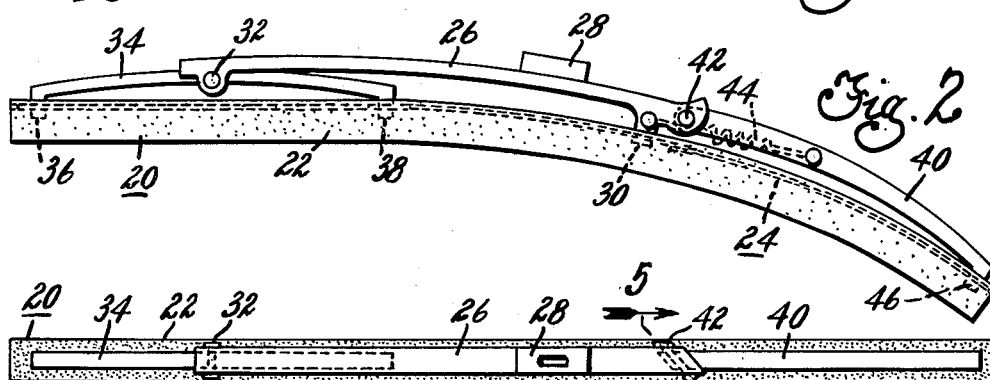
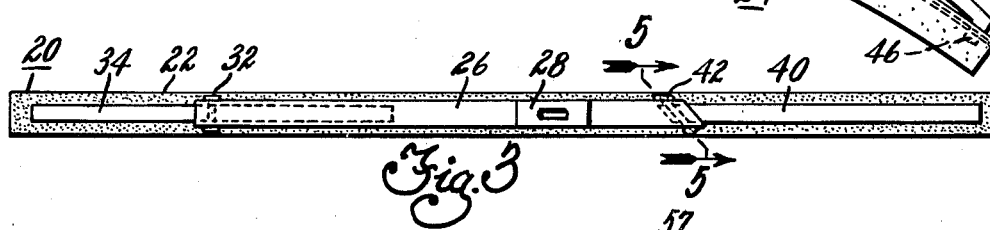
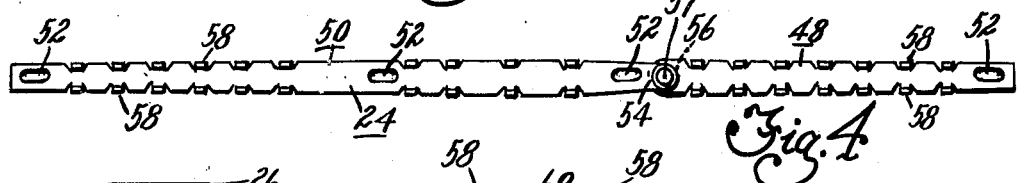
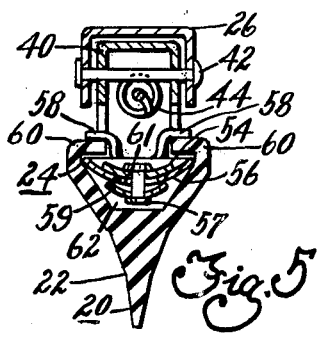
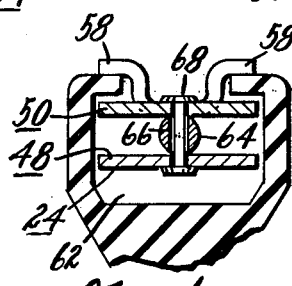
INVENTOR
JOHN G. HART
BY
HIS ATTORNEY May 30, 1961 J. G. HART 2,985,904
WINDSHIELD WIPER BLADE ASSEMBLIES
Filed Oct. 29, 1958 2 Sheets-Sheet 2
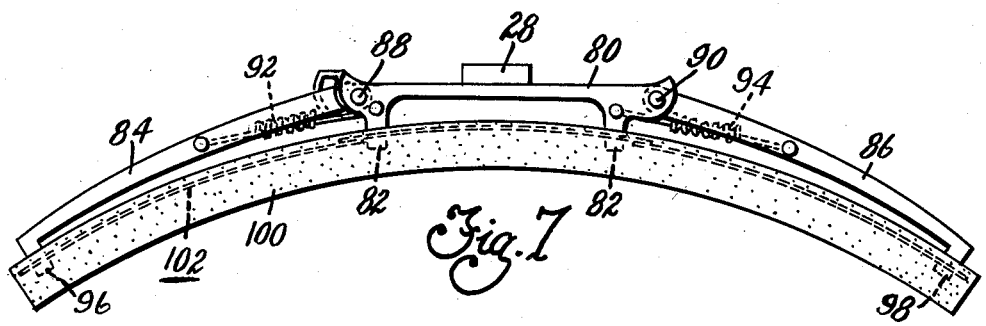
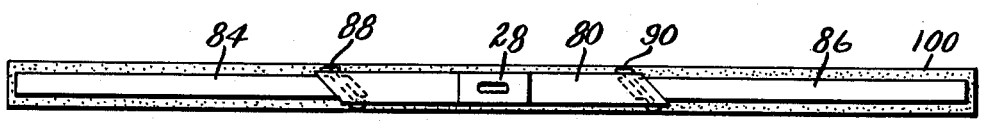
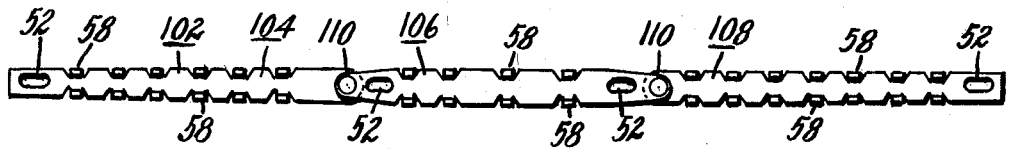
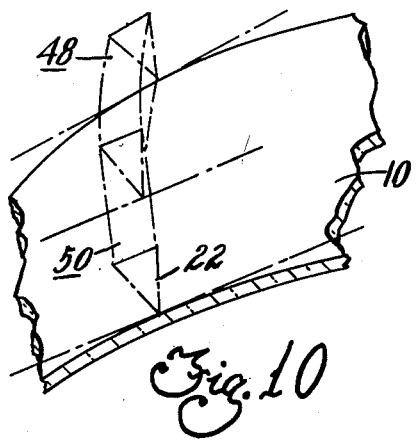
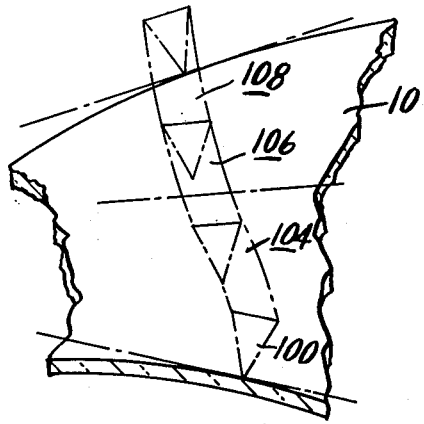
INVENTOR.
JOHN G. HART
BY
HIS ATTORNEY

United States Patent Office 2,985,904
Patented May 30, 1961

2,985,904

WINDSHIELD WIPER BLADE ASSEMBLIES

John G. Hart, Rochester, N.Y., assignor to General Motors Corporation, Detroit, Mich., a corporation of Delaware Filed Oct. 29, 1958, Ser. No. 770,358

14 Claims. (Cl. 15—250.42)

This invention pertains to the art of windshield cleaning, and particularly to improved blade constructions designed for wiping curved surfaces.

It is well recognized that in order to adequately clean a surface with a squeegee, the squeegee must be maintained substantially normal to the surface. Moreover, in order to clean a curved surface, the squeegee must be supported by a backing which is flexible in plane normal to the surface to be wiped and substantially inflexible in a plane parallel to the surface to be wiped. Heretofore, it has been proposed to incorporate oblique pivot, or hinge, joints between the primary and secondary pressure distributing members which are connected to the squeegee unit, comprising a wiping element and a flexible backing strip, at longitudinally spaced points in instances where it is desired to wipe compound curved surfaces such as a wrap-around windshield. With this type of blade construction, the wiping element will be maintained substantially normal to the curved surface as it traverses the severely curved or wrap-around portions thereof during its oscillatory stroke. A wiper blade assembly of this type is disclosed in copending application Serial No. 611,434, filed September 24, 1956, in the name of Louis P. Garvey and assigned to the assignee of this invention.

While the blade assembly of the aforementioned copending application is vastly superior to conventional blade assemblies wherein the pivot joints between the pressure distributing linkage members located at right angles to the longitudinal axis of the blade, a substantial improvement can be effected by utilizing a multi-part backing strip which enables relative movement between the several parts of the backing strip to different planes. Stating it another way, if the squeegee unit includes a rubber wiping element and an elongate integral backing strip which is flexible in a plane normal to the surface to be wiped while being substantially inflexible in a plane parallel to the surface to be wiped, during relative pivotal movement between the primary and secondary pressure distributing members, the backing strip must be twisted since it is only flexible in a single plane. This twisting movement of the backing strip to enable the portion actuated by the oblique shaft joints to remain in a plane parallel to the curved surface requires additional wiper arm pressure, and even though the wiper arm pressure is increased, the backing strip resists twisting to a substantial extent thereby hindering the utility of the oblique hinges between the primary and secondary pressure distributing members.

The present invention relates to improved wiper blade assemblies including one or more oblique hinge joints between the primary and secondary pressure distributing members, in combination with a multi-part backing strip whereby it is unnecessary to twist the backing strip to maintain portions thereof in a plane parallel to the curved surface. Accordingly, among my objects are the provision of an improved blade assembly particularly designed for cleaning curved surfaces; the further provision of a blade assembly including pressure distributing linkage means wherein the pivot joints between the linkage members are located at an oblique angle relative to the longitudinal blade axes in combination with a multi-part backing strip; and the still further provision of a multi-part backing strip assembly for flexible wiper blades.

The aforementioned and other objects are accomplished in the present invention by interconnecting parts of the flexible backing strip so as to enable parts to be positioned in different planes. Specifically, two embodiments of an improved flexible windshield wiper blade assembly are disclosed herein. In the first embodiment, pressure distributing linkage is generally of the type disclosed in copending application Serial No. 624,095, filed November 23, 1956, now Patent No. 2,920,335, in the name of Francis M. Ryck and assigned to the assignee of this invention. Thus, the pressure distributing linkage comprises a holder, or primary pressure distributing member, a cantilever arm and a yoke, the cantilever arm and yoke constituting secondary pressure distributing members. An oblique hinge joint is incorporated between the outer end of the holder and the cantilever arm, and to facilitate proper conformance of the squeegee unit to curved surfaces, the backing strip comprises two parts, namely a first backing strip section having a length substantially equal to the length of the cantilever arm and a second backing strip section having a length equal to the remaining length of the wiper blade. The two sections have superposed end portions and are either connected by a loose pivot joint and a ball, or by a simple ball and socket joint. The oblique hinge joint between the primary pressure distributing members and the cantilever arm is disposed in a plane parallel to the frontal portion of the wrap-around windshield, which plane is parallel to the plane of flexibility of the backing strip and the squeegee unit.

In the second embodiment, the pressure distributing linkage is of the general type disclosed in copending application Serial No. 428,562, filed May 10, 1954, now Patent No. 2,876,478, in the name of Cyril T. Wallis and assigned to the assignee of this invention. Thus, the pressure distributing linkage comprises a holder in the form of a primary yoke and a pair of spring-biased cantilever arms connected to opposite ends of the holder. In this embodiment, a three-part backing strip is embodied in the squeegee unit, comprising a central section, the ends of which are superposed over the ends of the end sections, suitable loose pivot or ball and socket joints being provided between the superposed ends of the backing strip sections.

Further objects and advantages of the present invention will be apparent from the following description, reference being had to the accompanying drawings, wherein preferred embodiments of the present invention are clearly shown.

In the drawings:

Figure 1 is a fragmentary view, in elevation, of a vehicle equipped with a wiper blade constructed according to this invention.

Figure 2 is a side view, in elevation, of the wiper blade constructed according to one embodiment of this invention.

Figure 3 is a plan view, in elevation, of a wiper blade constructed according to the first embodiment of this invention.

Figure 4 is a plan view, in elevation, of a multi-part backing strip of the first embodiment.

Figure 5 is a sectional view taken along line 5—5 of Figure 3.

Figure 6 is a fragmentary sectional view similar to Figure 5 of a modified connection between the backing strip sections.

Figure 7 is a side view, in elevation, of a wiper blade constructed according to the second embodiment of this invention.

Figure 8 is a plan view in elevation, of a wiper blade constructed according to the second embodiment.

Figure 9 is a plan view of the three-part backing strip utilized in the second embodiment.

Figure 10 is a composite sectional view depicting the operation of the wiper blade constructed according to the first embodiment.

Figure 11 is a composite sectional view depicting the operation of the wiper blade constructed according to the second embodiment.

Figure 12 is a fragmentary sectional view of a modified linkage joint.

With particular reference to Figure 1, a portion of a vehicle is shown including a wrap-around windshield 10 and a cowl 12. Figure 1 depicts a left-hand portion of a windshield as viewed from the front of the vehicle, it being understood that in accordance with conventional practice, the vehicle is equipped with a pair of windshield wiper blade and arm assemblies which are asymmetrically oscillated across the outer surface of the windshield. Thus, each windshield cleaner comprises an arm 14 having spring hinge connected inner and outer sections, 16 and 18, the outer section being spring-biased against the windshield and carrying a wiper blade which may be detachably connected thereto, the wiper blade being generally indicated by the numeral 20.

The wiper blade is moved throughout a predetermined oscillatory stroke from the dotted line position of Figure 1 to the full line position shown in Figure 1, which positions constitute the inboard and outboard limits of the running strokes. As it is well recognized that the wrap-around windshield is severely curved adjacent the outboard stroke portion of the running stroke, it is difficult to maintain the normal attitude of the squeegee unit, comprising a rubber wiping element and a flexible backing strip assembly, in this area. Thus, in conventional wiper blades, the blade lay-over in the outboard area of the wrap-around windshield is appreciable, and in some instances the blade lay-over is so far that the metal portions of the blade assemblies may contact the windshield with resultant scratching of the windshield surface.

With particular reference to Figures 2 through 4, in the first embodiment of the improved blade assembly of this invention, the wiper blade includes a squeegee unit comprising an elongate elastomeric wiping element 22 which is carried by a metal backing strip assembly generally indicated by the numeral 24. The squeegee unit is freely flexible in a plane normal to the surface to be wiped, but substantially inflexible in a plane parallel to the surface to be wiped. As disclosed in the first embodiment, the pressure distributing linkage comprises a holder 26, or pressure distributing member having a wiper arm attaching clip 28. The outer end of the holder 26 is formed with an integral spring-type clip 30 having hooked ends. The inner end of the holder 26 is connected by pivot pin 32 located at right angles to the longitudinal blade axis to a secondary pressure distributing member 34 in the form of a yoke. Opposite ends of the secondary pressure distributing member 34 likewise have integral spring metal-type clips 36 and 38. A cantilever arm 40 is pivotally connected to the outer end of the holder 26 by a pivot pin 42 located at an oblique angle to the longitudinal axis of the blade. In addition, the cantilever arm is spring-biased towards the windshield by a compression spring 44, opposite ends of which are operatively connected with the holder 26 and the cantilever arm 40. The outer end of the cantilever arm is formed with an integral spring-type clip 46. The aforedescribed pressure distributing linkage comprises an elongated resilient flexible surface conforming support for the wiping element and backing strip assembly and includes twist imparting means comprising the oblique hinge pin 42.

The backing strip assembly 24 comprises two spring metal sections 48 and 50. Each section is composed of spring metal which is flexible in a plane normal to the surface to be wiped, and by reason of its substantial width relative to its thickness, each section is substantially inflexible in a plane parallel to the surface to be wiped. The backing strip assembly is formed with four longitudinally spaced slots 52, two adjacent the ends thereof and two in the medial portion thereof, which receive the integral spring clips formed on the ends of the pressure distributing members.

With particular reference to Figures 4 and 5, the backing strip section 50 has its outer end portion superposed over the inner end portion of the backing strip section 48. The outer end of the section 50 has a stamped ball projection 54 formed therein, the inner end of the section 48 has a stamped socket section 56 therein which permits relative universal movement between the two sections of the backing strip assembly. The ball and socket joint is disposed substantially beneath the oblique spring hinge connection between the holder and the cantilever arm, and the parts are held in assembled relation by a rivet 57. The rivet extends through an enlarged slot 61 in the strip 56 and also engages a spring washer 59.

Each of the backing strip sections 48 and 50 is formed with a plurality of upstanding lugs 58 formed in pairs along opposite ends of the backing strip assembly. The upstanding lugs 58 have portions arranged in a plane spaced from but substantially parallel to the present plane of the backing strip so as to retain therebetween the angular ribs, or lips 60, of the squeegee. Thus, when the backing strip assembly is inserted into the backing chamber 62 of the wiper element so as to form a squeegee unit, the lugs 58 embrace the ribs 60 so as to securely retain the backing strip assembly connected with the wiping element.

With reference to Figure 6, a modified universal connection between the two backing strip sections is disclosed. In the modified construction, a ball 64 is interposed between the two ends of the backing sections 48 and 50, the ball having an enlarged diametrical slot 66 therethrough for loosely receiving a pin 68, or rivet, the ends of which are peened over. The purpose of the multi-part backing strip is to enable the outer section 48 to follow the curvature of the windshield in the wrap-around portion thereof when the cantilever arm pivots about the oblique hinge connection with the holder. The loose universal joint connection between the backing strip sections enables the outer section of the backing strip 48 to be positioned in a plane parallel to the severely curved portion of the windshield whereby the rubber wiping element will be maintained in a substantially normal attitude throughout the wiping stroke.

The oblique hinge axis between the cantilever arm and the holder is in a plane substantially normal to the direction of the pressure applied to the holder by the wiper arm, and is also parallel to the major plane of the frontal portion of the wrap-around windshield.

With particular reference to Figure 7, a modified blade assembly is disclosed, which blade assembly may be termed as a double ended cantilever type. The blade assembly disclosed in Figures 7 through 9 would be used in instances where the running stroke of the wiper blade is such that both the outer portion and the inner portion of the wiper blade traverse severely curved surfaces. The pressure distributing linkage disclosed in Figure 7 comprises a holder, or primary yoke 80, opposite ends of which are formed with integral spring clips 82. A pair of cantilever arms 84 and 86 are pivotally connected to opposite ends of the holder 80, by hinge pins 88 and 90 having an oblique angular relationship relative to the longitudinal blade axis. In addition, the cantilever arms are spring-biased toward the windshield by compression springs 92, 94 respectively. The free ends of the cantilever arms are formed with spring clips 96 and 98. The aforedescribed pressure distributing linkage comprises an elongated resilient flexible surface conforming support for the wiping element and backing strip assembly, and includes twist imparting means comprising the oblique hinge pins 88 and 90.

In the second embodiment, the squeegee unit includes a rubber wiping element 100 of substantially the same type as disclosed in Figure 1, but the backing strip assembly 102 comprises three sections, 104, 106 and 108. The intermediate section 106 has its end portions interposed over the end portions of the outer sections 104 and 108. In addition, the three sections are interconnected by joints 110 permitting limited universal movement therebetween, the universal joints being disposed beneath the oblique spring hinge connections between the holder and the cantilever arms.

With particular reference to Figure 10, operation of windshield wiper blades constructed according to the first embodiment is depicted, from which it can be seen that the oblique spring hinge connection between the holder and the cantilever arm together with the multi-section backing strip enables the outer section of the wiper blades to be maintained substantially normal to the windshield surface. As clearly indicated in this figure, the outer section 48 of the backing strip moves relative to the inner section 50 so as to be maintained in a plane parallel to the curved surface. Similarly, as shown in Figure 11 with a three-part backing strip, the three sections thereof move relative to each other so as to be positioned in plane substantially parallel to the curved surface being traversed, and thereby twist the wiping element as shown in the drawings.

With reference to Figure 12, the modified joint between the holder 26 and the member 40 is adjusted wherein the axis of the rivet, or hinge pin, 42 is not only oblique to the longitudinal blade axis as in the previous embodiments, but is also oblique to the plane of the backing strip assembly.

While the embodiments of the invention as herein disclosed constitutes preferred forms, it is to be understood that other forms might be adopted.

What is claimed is as follows:

1. A flexible backing strip assembly for a wiper blade including, a plurality of elongate members having superposed end portions, said members having a greater width than thickness so as to be flexible in a single plane and relatively inflexible in a plane transverse to said plane, and universal joint means between the superposed end portions of said members permitting relative movement between said members so that the planes of flexibility of said members can differ.

2. A flexible backing strip for a wiper blade assembly including, a pair of elongate members having superposed end portions, said members having greater width than thickness so as to be flexible in a single plane and substantially inflexible in a plane transverse to said plane, and a ball and socket joint connection between the superposed end portions of said members permitting relative movement between said members whereby the planes of flexibility of said members can differ.

3. A flexible backing for a wiper blade including, three elongate members, each member having a greater width than thickness so as to be flexible in a single plane but substantially inflexible in a plane transverse to said plane, said members being arranged in end to end relation with opposite ends of the middle portion being superposed over the inner ends of the end members, and universal joint means between the superposed ends of said members permitting relative movement between said members so that their planes of flexibility can differ.

4. A flexible backing for a wiper blade including a plurality of elongate spring metal members arranged end to end and having superposed end portions, each member having greater width than thickness so as to be flexible in a single plane but substantially inflexible in a plane transverse to said plane, and universal joint means connecting the superposed end portions of said members permitting relative movement between said members so that their planes of flexibility can differ.

5. The flexible backing assembly set forth in claim 4 wherein said universal joint means comprises an integral socket formed in the end portion of one of said members and an integral ball formed in the end of the superposed member.

6. The backing assembly set forth in claim 4 wherein the universal joint means comprise a ball interposed between the superposed ends of said members, said ball having a diametrical slot therethrough, and a pin loosely received in said slot and extending therethrough, said pin being operatively connected at opposite ends to each of said members.

7. A windshield wiper blade for wiping a curved windshield surface having a frontal portion and a wrap-around portion including, an elongate elastomeric wiping element, a backing strip assembly attached to said wiping element comprising a plurality of elongate members having superposed end portions, said backing strip members being flexible in a plane normal to the surface to be wiped and substantially inflexible in a plane parallel thereto, universal joint means between the end portions of said members, and a pressure distributing linkage, said pressure distributing linkage comprising a primary pressure distributing member and a plurality of secondary pressure distributing members, the ends of the secondary pressure distributing members being movably connected to the backing strip assembly, the ends of the primary pressure distributing member being pivotally connected to the secondary pressure distributing members, the axes of the pivot joints being adjacent the universal joint means between said backing strip members and lying in a plane parallel to the major plane of the frontal portion of the windshield surface and being oblique to the longitudinal axis of the blade.

8. A wiper blade assembly for wiping a curved windshield surface having a frontal portion and a wrap-around portion including, a squeegee unit freely flexible in a plane normal to the surface to be wiped but substantially inflexible in a plane parallel to the surface to be wiped including, a multi-part flexible backing assembly comprising a pair of elongate members having superposed ends and universal joint means between the superposed ends thereof, pressure distributing means connected to said squeegee unit for applying wiping pressure to said squeegee unit at a plurality of longitudinally spaced points, said pressure distributing means including a primary pressure distributing member and a secondary pressure distributing member, and hinge means pivotally interconnecting the primary and secondary pressure distributing members and located adjacent the universal joint means between said backing strip members, the axis of said hinge means lying in a plane parallel to the major plane of the frontal portion of the windshield surface and being located at an oblique angle relative to the blade axis.

9. A flexible wiper blade assembly for wiping a curved windshield surface having a frontal portion and a wrap-around portion, including, a flexible squeegee unit including a flexible backing strip assembly comprising a pair of members having superposed end portions and universal joint means therebetween, said backing strip members being flexible in a plane normal to the surface to be wiped and substantially inflexible in a plane parallel thereto, and pressure distributing means connected to said squeegee unit for applying wiping pressure to said squeegee unit at a plurality of spaced points, said distributing means comprising a holder, a secondary yoke and a cantilever arm, one end of said holder being connected by hinge means to the end portion of said cantilever arm adjacent the superposed ends of said backing members, the axis of said hinge means lying in a plane parallel to the major plane of the frontal portion of said windshield surface and being located at an oblique angle relative to the longitudinal blade axis.

10. A wiper blade assembly for wiping a curved windshield surface having a frontal portion and a wrap-around portion including, a flexible squeegee unit including a flexible backing strip assembly comprising three elongate backing members arranged lengthwise and having superposed end portions with universal joint means between the superposed end portions, said backing strip members being flexible in a plane normal to the surface to be wiped and substantially inflexible in a plane parallel thereto, and pressure distributing means connected to said squeegee unit for applying wiping pressure to said squeegee unit comprising a holder and a pair of cantilever arms pivotally connected to the ends of said holder adjacent the universal joint connections between the end portions of said backing member, the axes of said pivotal connections lying in a plane parallel to the major plane of the frontal portion of the windshield surface and being located at an oblique angle relative to the longitudinal axis of the blade.

11. A windshield wiper blade for wiping a curved surface including, a flexible squeegee unit adapted to conform to the surface to be wiped including a flexible backing strip assembly comprising at least two elongate backing members arranged lengthwise and having superposed ends with universal joint means between superposed ends thereof, said backing strip members being flexible in a plane normal to the surface to be wiped and substantially inflexible in a plane parallel thereto, and a pressure distributing linkage connected to said squeegee unit comprising a holder adapted to receive pressure from a single source and distribute said pressure to said squeegee unit at a plurality of spaced points, said holder being pivotally connected with at least one secondary pressure distributing member, the pivotal connection being adjacent the superposed end portions of said backing members, said pivotal connection comprising hinge means, the axis of said hinge means lying in a plane substantially normal to the direction of pressure applied to said holder from said single source and being located at an oblique angle relative to the longitudinal axis of the blade.

12. A wiper blade assembly including a squeegee unit freely flexible in a plane normal to the surface to be wiped but substantially inflexible in a plane parallel to said surface, including, a flexible backing strip assembly comprising a plurality of backing members arranged lengthwise and having superposed end portions with universal joint means between the superposed end portions thereof, said backing strip members being flexible in a plane normal to the surface to be wiped and substantially inflexible in a plane parallel thereto, pressure distributing means connected to said squeegee unit for applying wiping pressure to said squeegee unit at a plurality of spaced points, said pressure distributing means comprising primary and secondary pressure distributing members, and hinge means pivotally interconnecting the primary and secondary pressure distributing member, the axis of the hinge means lying in a plane normal to the direction of pressure applied to said squeegee unit by said pressure distributing means and being located at an oblique angle relative to the longitudinal axis of the blade.

13. A wiper for curved windshields, including a flexible, resilient, elongated wiping element, a backing strip assembly attached to said wiping element comprising a plurality of elongate members having superposed ends and universal joint means between the superposed ends thereof, said backing strip members being flexible in a plane normal to the surface to be wiped and substantially inflexible in a plane parallel thereto, and an elongated resilient flexible surface conforming support for the wiping element and the backing strip assembly extending longitudinally thereof and having an arm-attaching part, said support including twist imparting means operable to impose a normalizing twist to an outer end portion of the wiping element to maintain the wiping element substantially normal to the surface to be wiped.

14. A wiper for curved windshields, including a flexible, resilient, elongated wiping element, a backing strip assembly attached to said wiping element comprising a plurality of elongate members having superposed ends and universal joint means between the superposed ends thereof, said backing strip members being flexible in a plane normal to the surface to be wiped and substantially inflexible in a plane parallel thereto, and an elongated resilient flexible surface conforming support for the wiping element and the backing strip assembly extending longitudinally thereof and having an arm-attaching part, said support including twist imparting means operable to impose a normalizing twist to the inner and outer end portions of the wiping element to maintain the wiping element substantially normal to the surface to be wiped.

References Cited in the file of this patent

UNITED STATES PATENTS 2,697,241    Oishei                 Dec. 21, 1954